United States Patent [19]

Yelverton

[11] 3,803,389

[45] Apr. 9, 1974

[54] COURSE LINE COMPUTER

[76] Inventor: Richard L. Yelverton, 440-E. Woodrow Wilson Dr., Jackson, Miss. 39216

[22] Filed: Feb. 11, 1972

[21] Appl. No.: 204,870

[52] U.S. Cl............ 235/78, 235/61 NV, 235/88 N
[51] Int. Cl............................................. G06c 27/00
[58] Field of Search ......... 235/61 NV, 78, 88, 61 S, 235/84; 33/76 R, 76 UA, 1 SD

[56] References Cited

UNITED STATES PATENTS

| | | | |
|---|---|---|---|
| 2,405,601 | 8/1946 | Mullendore | 235/84 |
| 2,433,984 | 1/1948 | De Vries | 235/78 |
| 2,775,404 | 12/1956 | Lahr | 235/61 S |
| 3,184,845 | 5/1965 | Sanders | 33/1 SD |
| 3,360,195 | 12/1967 | Fisher | 235/78 |
| 3,471,084 | 10/1969 | Titus | 235/78 |
| 3,497,681 | 2/1970 | Warner | 235/78 |
| 3,609,299 | 9/1971 | Wright | 235/61 NV |

OTHER PUBLICATIONS

J. N. Arnold, "Special Slide Rules," Extension Series No. 32, Engineering Extension Department, Purdue University, Lafayette, Indiana, September, 1933.

*Primary Examiner*—Lawrence R. Franklin

[57] ABSTRACT

A mechanical computer of the circular slide rule type is described, which will permit a pilot to utilize a nagivational technique known as area navigation (RNAV). Scales are provided which permit the bearing angle of the desired course line and the azimuth of a line extending between a given point on the course line and a reference point to be added. This produces the angle of intercept between the latter two lines. A further scale is provided which is calibrated in logarithmic fashion and on which the sine of the aforementioned angle of intercept is inscribed. An additional scale containing distance data for the distance between the reference point and the given point on the course line in logarithmic increments is indexed with the scale having the sine of the angle of intercept thereon to provide a result which is the product of the aforementioned distance and the sine of the angle of intercept. A tab placed adjacent the angle of intercept on the sine scale rotates a plate to effectively program the computer to the constant derived in the aforementioned manner. A scale corresponding to the desired course line is rotated beneath a window on the aforementioned plate to yield bearings to and from the reference point. A window in the disc having the course scale thereon will appear over a scale yielding the distance to the reference point.

4 Claims, 12 Drawing Figures

FIG. 9

EXPANDED VIEW

FRONT PLATE

BACK PLATE

COURSE PLATE

AZIMUTH PLATE

BASE PLATE

DISTANCE PLATE
(FRONT)

DISTANCE PLATE
(BACK)

COURSE CARD

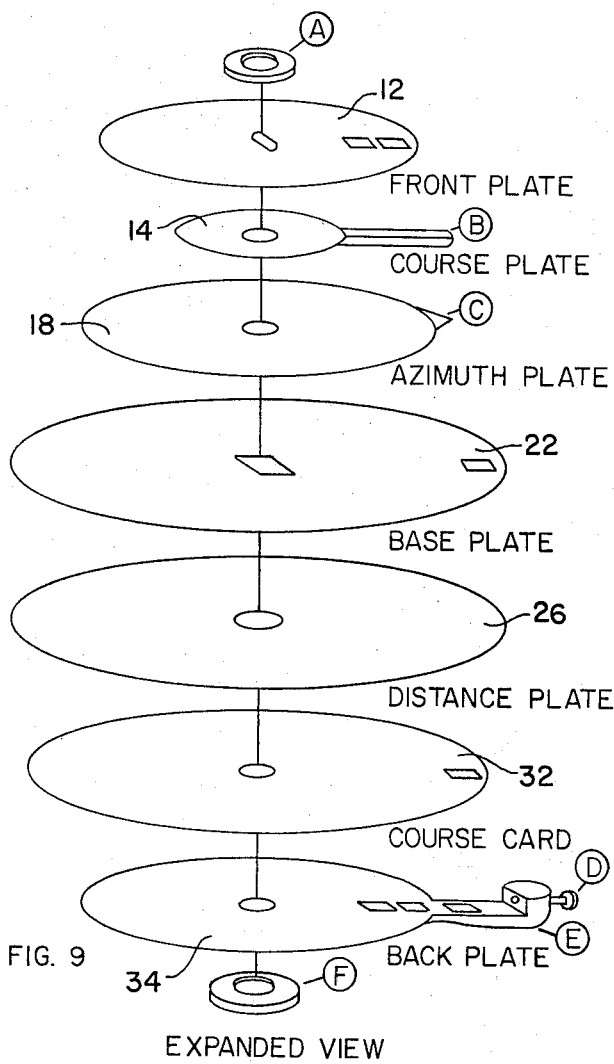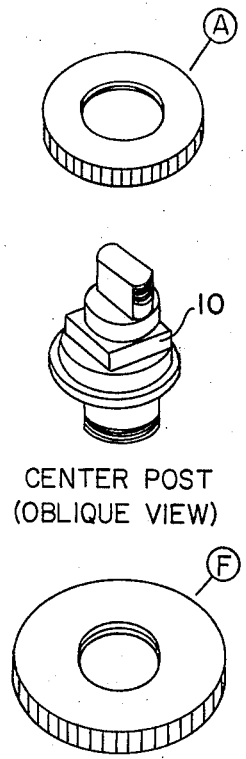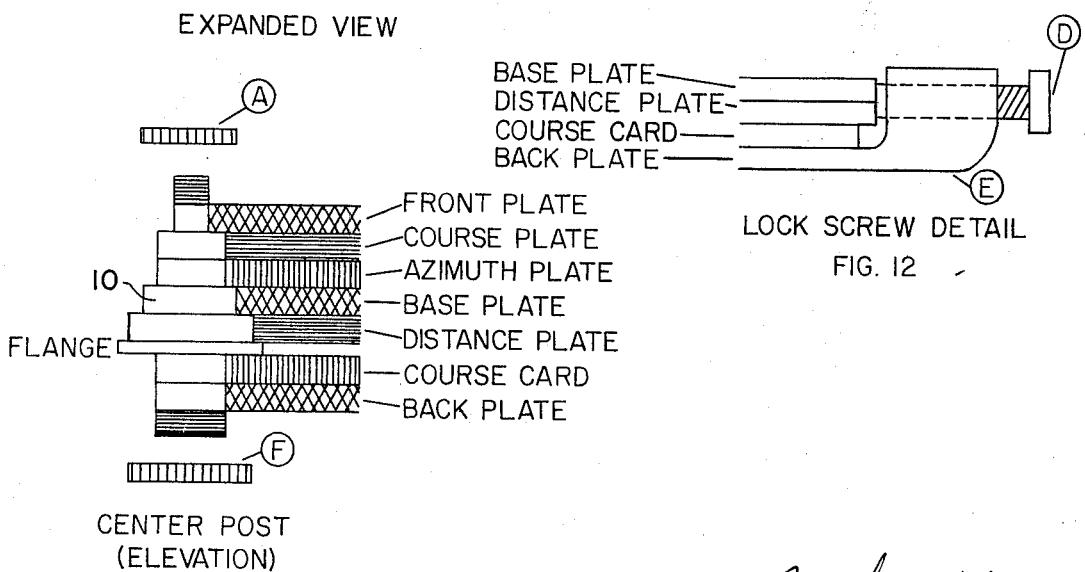

COURSE LINE COMPUTER

BACKGROUND OF THE INVENTION

This invention is related to mechanical computers of the circular slide rule type, and is particularly related to such a computer which can perform area navigation computations.

As electronic navigation aids have evolved, low frequency beacons have been supplanted by the presently used VHF omnidirectional beacons, which in addition to providing bearing information have UHF components which provide distance measuring information. The latter form of beacon is commonly referred to as VORTAC. With the more modern systems, it is still necessary in proceeding from one point to another to follow essentially a zig-zag path from Vortac station to Vortac station.

Recently, devices have been developed which would permit one to proceed from point to point on a constant course, but these devices are expensive and rather complex electronic computers. However, such point to point navigation offers significant advantages in time saved, reduced fuel consumption and reduced airway congestion.

The electronic computers necessary to perform the calculations necessary to the aforementioned point to point navigation, which is commonly referred to as area navigation, are, however, much too expensive to be applied to general civil aviation. Accordingly, for this type of air traffic to be able to utilize area navigation a simpler and less expensive means for performing the necessary calculations is required.

The majority of light twin and larger single engine aircraft presently in use do contain the basic navigational avionics necessary to conduct area navigation. By using distance measuring equipment (DME) and obtaining frequent Vortac bearings, one can proceed over a constant course line, if he has the benefit of readings from a directional gyroscopic indicator. In order to accomplish this, however, it is necessary to constantly compute corrections trigonometrically from the measured DME and Vortac values. Obviously, long hand computation, even using preset formulas, is too time consuming, and therefore, impractical.

If one were to supply a mechanical computer or slide rule type of device for performing these calculations it would be necessary that this device be capable of addition-subtraction and multiplication-division without combining these two functions into a single series of operations. When computing the various distances and bearings necessary for course line navigation, the final operation requires multiplication or division coupled with addition or subtraction. Currently, there is no simple mechanical computer capable of performing this function.

It is, therefore, an object of this invention to provide a simple means by which one can make both addition-subtraction and multiplication-division types of computations on the same apparatus.

A further object of this invention is to provide a means by which one can readily compute the bearing and distance from a course line to a predetermined reference point, such as a Vortac station.

SUMMARY OF THE INVENTION

The aforementioned objectives are achieved according to this invention in a circular slide rule type of device wherein: FIRST—The desired destination point (way point), related VORTAC facility and appropriate course to that point are determined. The matching course card (FIG. 8) is selected and inserted into the computer by removing the locknut "F" and back plate (FIG. 2). The latter is then replaced and secured with the locknut "F." SECOND—With the front plate erect (FIG. 1), tab "B" is rotated until the selected course reading appears in the window labeled COURSE. THIRD—Tab "C" is rotated until the magnetic bearing from the VORTAC facility to the destination point appears in the front plate window labeled AZIMUTH. FOURTH—The distance scale beneath the base plate is rotated until the distance in nautical miles from the VORTAC facility to the destination point appears within the base plate window labeled DISTANCE. FIFTH—Tab "E" is rotated to the position on the base plate scale opposite the degree reading which appears beneath tab "B." The small lockscrew "D" on tab "E" is then tightened thus securing the backplate, base plate, and distance plate.

With the computer properly aligned, it is turned over so that the back plate (FIG. 2) is placed in the upright position for use. When the course card is rotated, different bearings will appear in the VORTAC BEARING windows of the back plate. For each degree of bearing appearing in these windows a corresponding distance in nautical miles will appear in the course card window labeled VORTAC DISTANCE. As one navigates along the preselected course, to and from the destination point, all bearings and corresponding distances to the related VORTAC facility appearing on the computer will describe points on that course line. When the VORTAC facility is located to the right of the course line, the TO bearing is used. The FROM bearing is used when the VORTAC facility is to the left of the course line.

A pilot is now able to fly an airplane along any preselected course to and from a destination point by using the DIRECTIONAL GYROSCOPIC HEADING INDICATOR and making corrections as determined by my invention when used in conjunction with a properly tuned VORTAC INDICATOR and properly tuned DISTANCE MEASURING EQUIPMENT.

BRIEF DESCRIPTION OF THE DRAWINGS

The principles of this invention will be most readily understood by reference to a detailed description, given hereinbelow, of a preferred embodiment constructed according to these principles. The drawings illustrating this description are briefly described as follows:

FIG. 9 is an exploded, isometric view of the entire computer illustrating the relationship of all the plates;

FIG. 10 is an exploded, isometric view of the center post on which the plates are assembled and about which they rotate;

FIG. 11 is a partial, side view showing the plates assembled on the center post and FIG. 12 is a side view of the lock screw portion of the back plate.

DETAILED DESCRIPTION OF THE DRAWINGS

It should be noted that in all figures like reference letters and numerals refer to like elements.

Figure 1:
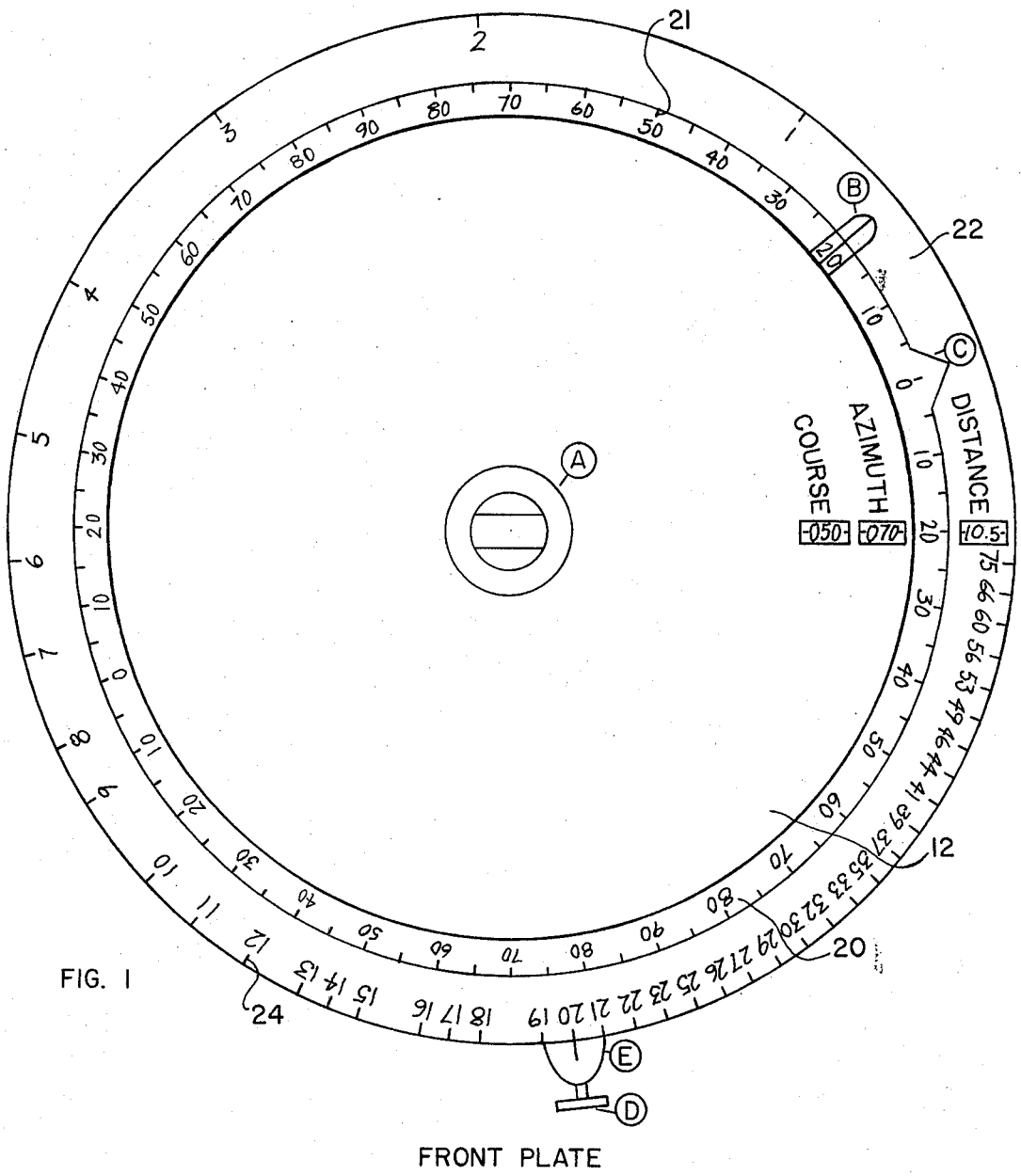
FIG. 1 is a top elevation of the front of the computer showing the assembled relationship of the front plate, the course plate, the azimuth plate, the base plate and the distance plate.

FIG. 1 on the accompanying drawings shows the front plate in the up position. It should be noted that in all figures like reference letters and numerals refer to like elements. Nut "A" of FIG. 1 holds the front plate 12 in a rigid position with respect to the base plate 22 of FIG. 5 when mounted on the center post 10 illustrated in FIG. 11. The square center cut of the base plate of FIG. 5 is so aligned with the slotted center cut of the front plate 12 of FIG. 1 that the two windows labeled AZIMUTH and COURSE of the front plate remain adjacent to the window labeled DISTANCE on the base plate.

Figure 3:
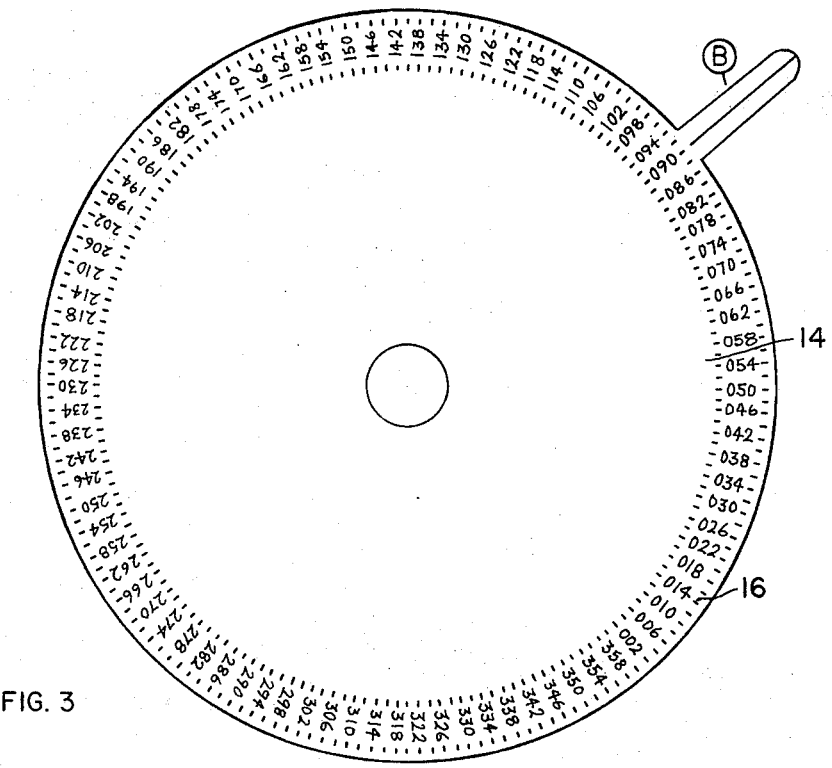
FIG. 3 is a top elevation of the course plate partially visible in FIG. 1.
Figure 4:
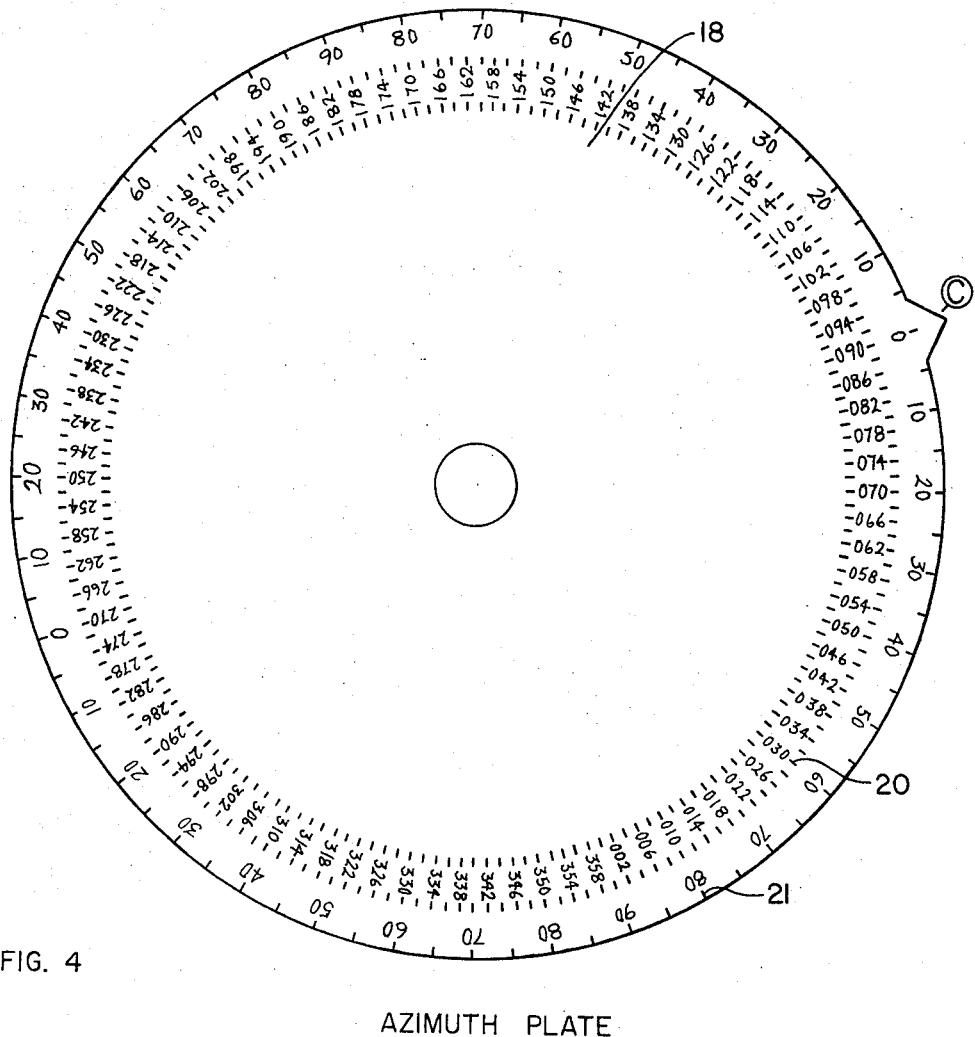
FIG. 4 is a top elevation of the azimuth plate partially visible in FIG. 1.

The course plate 14 of FIG. 3 is mounted directly below the front plate on the center post 10 in a manner which allows rotation by means of the clear scored plastic tab labeled "B." As shown in FIG. 1, the various numbers of scale 16 displayed on the course plate will appear in the front plate window labeled COURSE as tab "B" is rotated in either direction. The azimuth plate 18 of FIG. 4 is located on the center post below the course plate of FIG. 3 and allowed to rotate in a similar fashion by moving the clear plastic tab "C." As Tab "C" is moved in either direction the various numbers of scale 20 appear in the AZIMUTH window of the front plate as illustrated in FIG. 1. The previously mentioned base plate 22 of FIG. 5 is mounted below the azimuth plate of FIG. 4 on the center post. The numbers displayed in radial fashion on scale 24 along the margin of the base plate of FIG. 5 provide the alignment for tab "E" as seen in FIG. 1.

Figure 6:
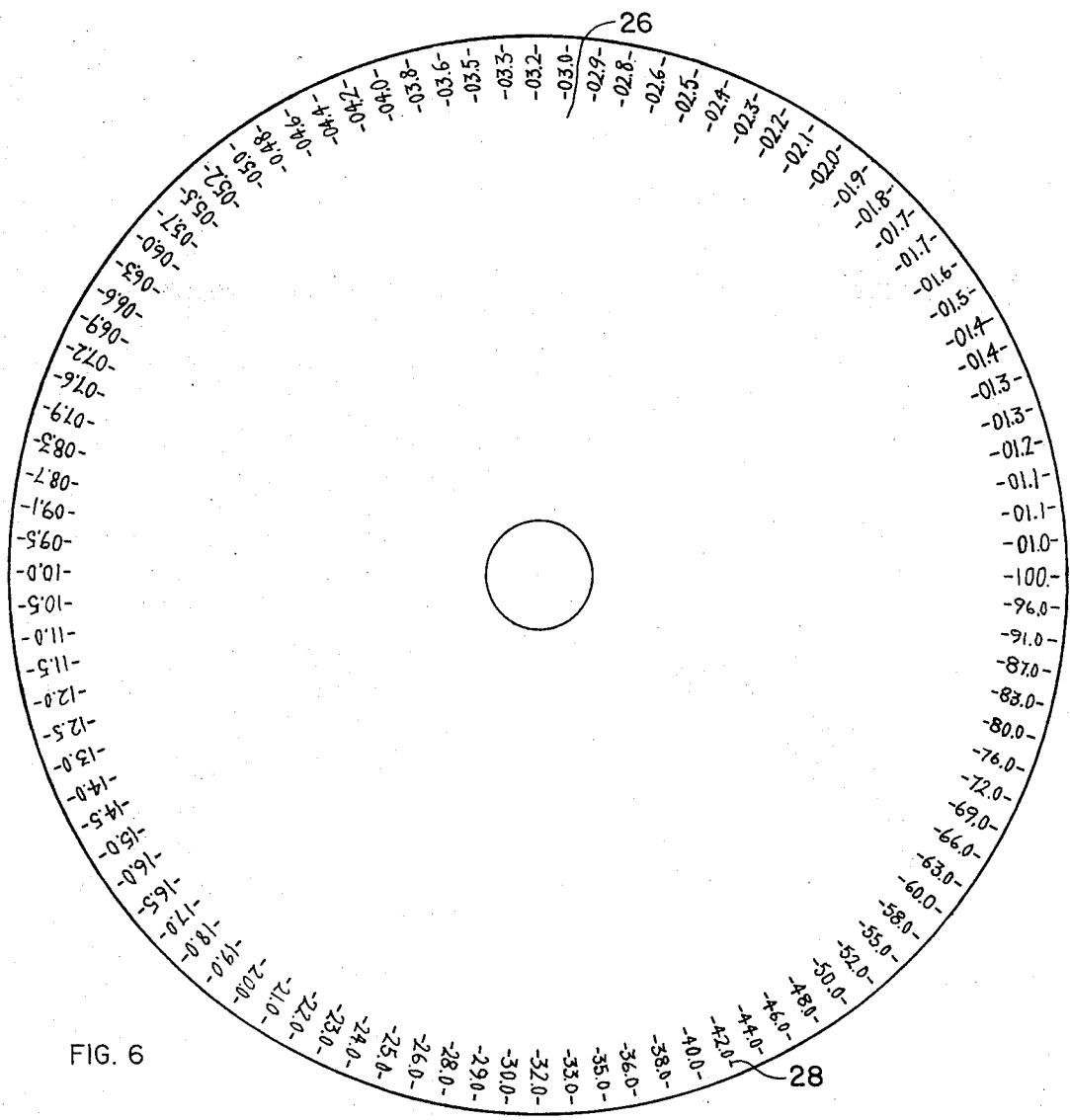
FIG. 6 is a top elevation of the front portion of the distance plate, partially visible in FIG. 1.
Figure 7:
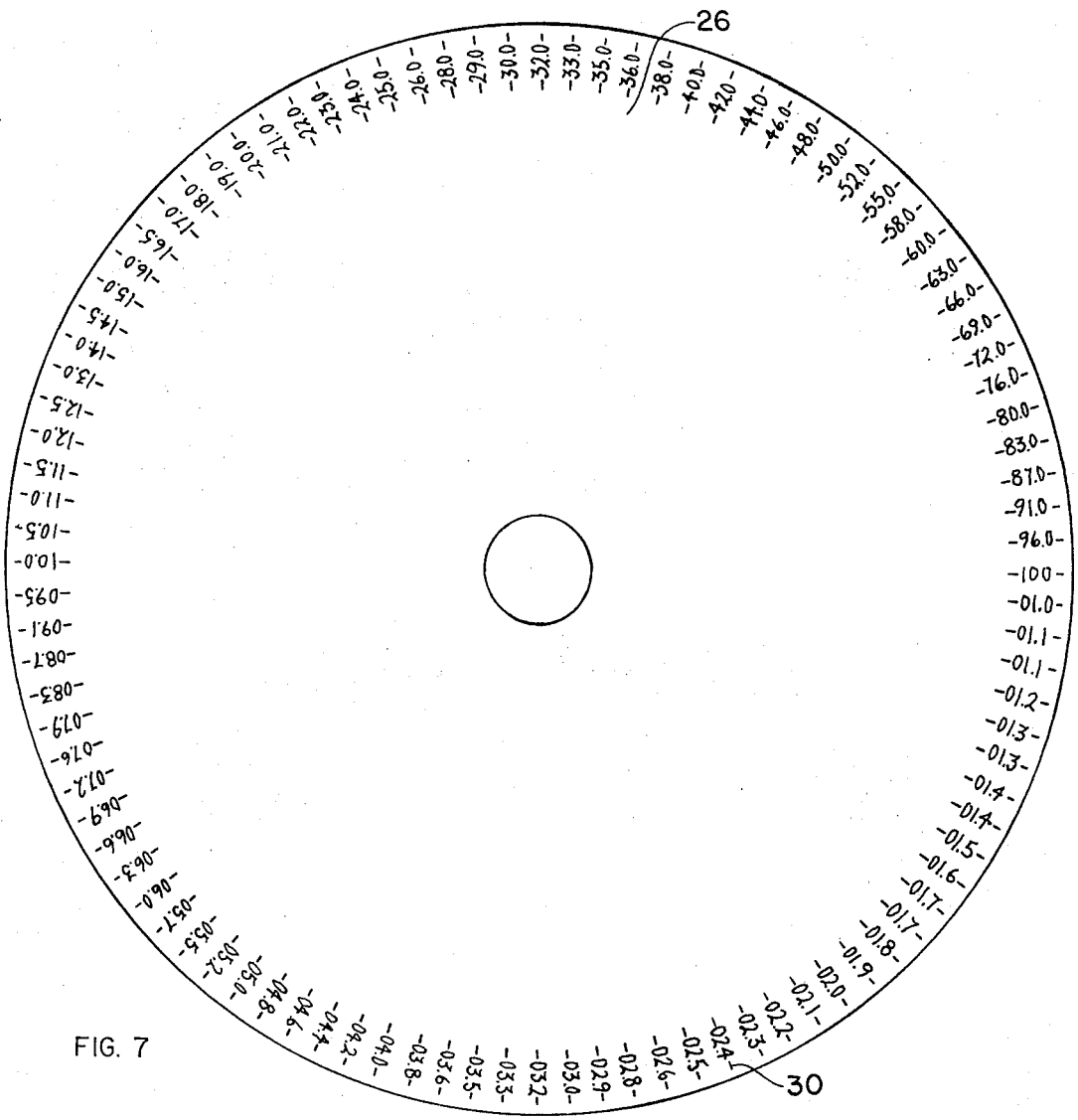
FIG. 7 is a top elevation of the back portion of the distance plate, partially visible in FIG. 2.

The distance plate of FIG. 6 and FIG. 7 is mounted beneath the base plate on the center post and seated on the flange shown in FIG. 11. The calibration of the distance plate is inscribed on the front (FIG. 6) and on the back (FIG. 7). That is, the distance plate is a circular scale having indicia occurring thereon at 3.6° intervals with the scale, therefore, being divided into 100 such intervals. At any given geometric position around the periphery of the distance plate, the same numeral will appear both on the front and back sides of the distance plate. Each such numeral represents a logarithmic calibration, to the base 10, of the numbers from 1.0 to 100. The numerals assigned to each marked geometric position on the distance plate correspond to the logarithmic value at that particular position rounded to the nearest one tenth. The logarithmic calibration on the front of the distance plate increases in a counterclockwise direction around the periphery of the plate, while the calibration on the other side of the plate is calibrated so that the numerals increase in the clockwise direction.

Figure 5:
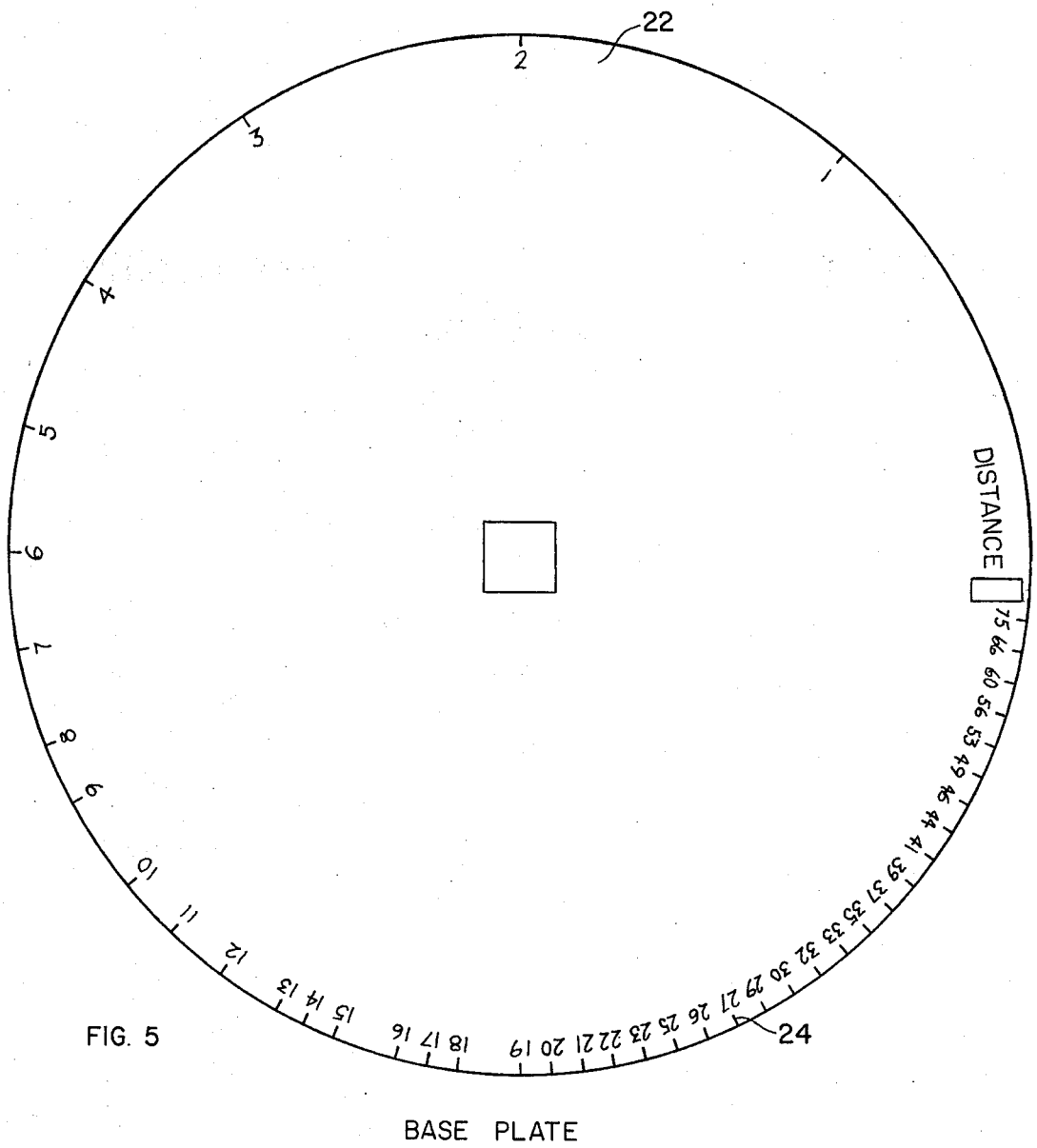
FIG. 5 is a top elevation of the base plate partially visible in FIG. 1.

As the distance plate is rotated, the various numbers of the scale 30 on the front appear in the window labeled DISTANCE of the base plate in FIG. 5. The numbers of the back of the distance plate will appear in the window labeled VORTAC DISTANCE of the course card 32 in FIG. 8.

Figure 2:
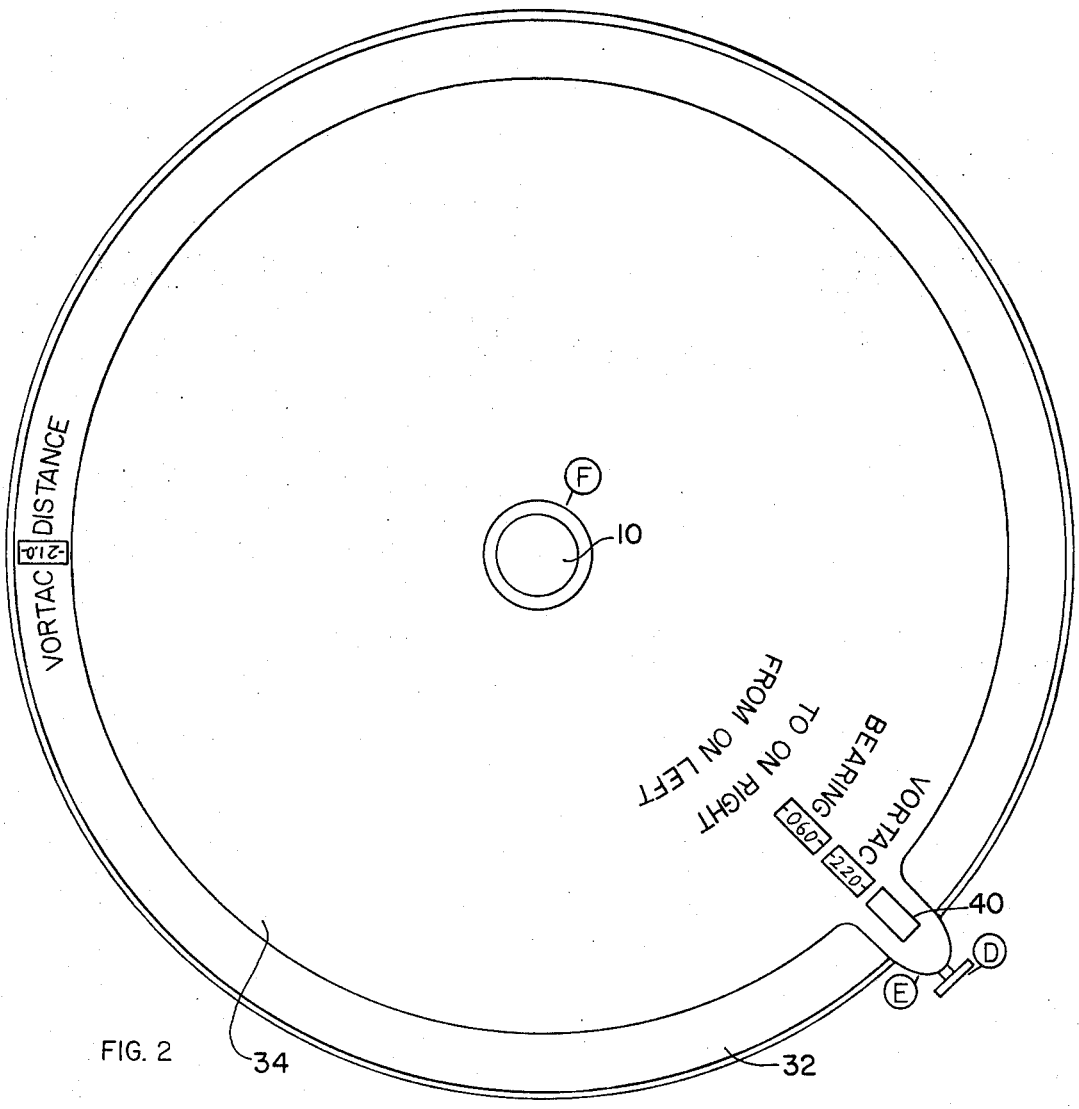
FIG. 2 is a top elevation of the back of the computer showing the assembled relationship of the distance plate, the course card and the back plate.
Figure 8:
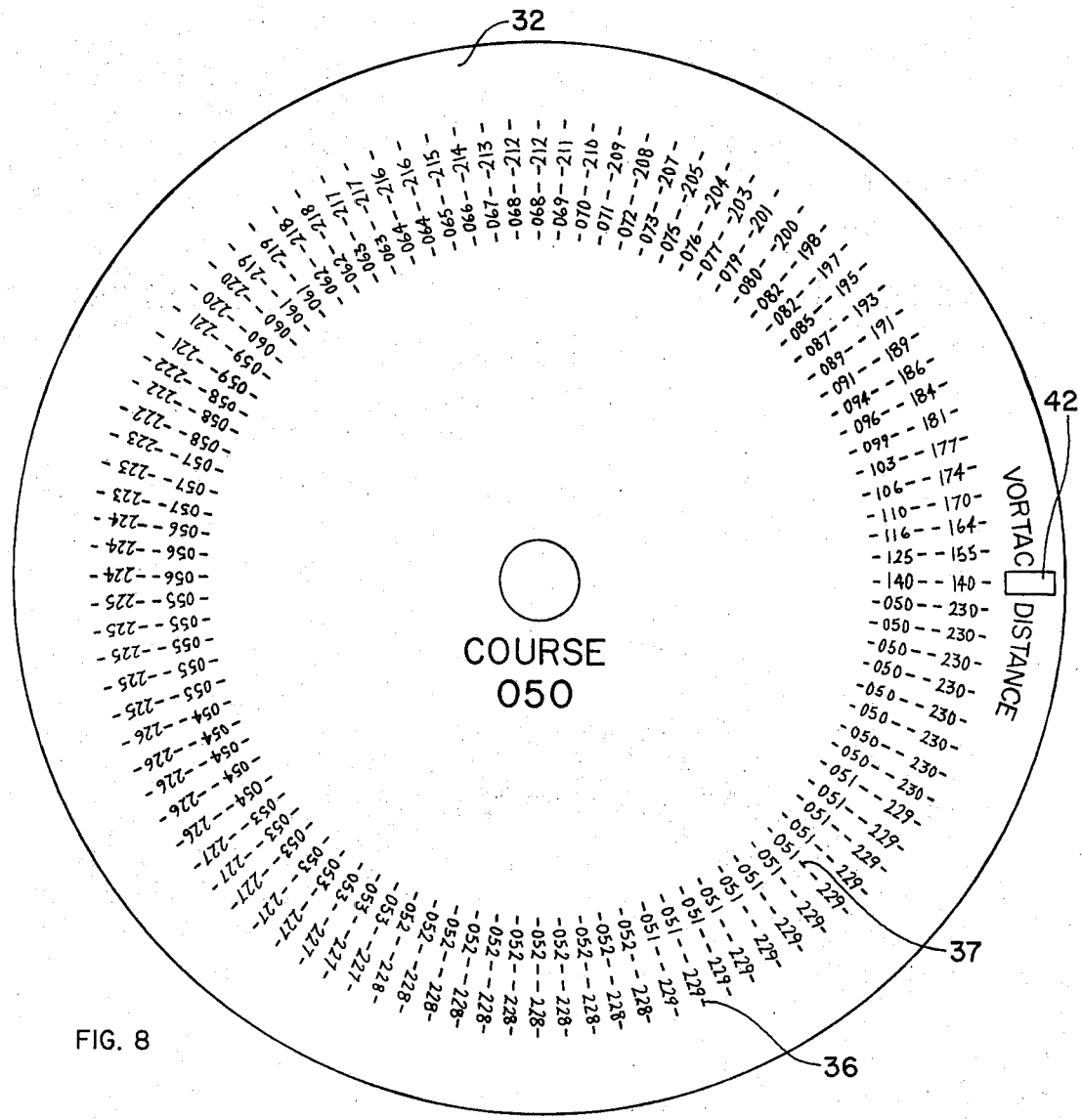
FIG. 8 is a top elevation of the course card, partially visible in FIG. 2.

The course card 32 in FIG. 8 is one of three hundred and sixty interchangeable cards which can be inserted and removed by removing locknut "F" and the back plate 34 shown in FIG. 2. The course card is allowed to rotate freely on the center post after replacing the back plate and securing locknut "F." The course card is a circular scale having 100 different indicia spaced one from the other at 3.6° intervals, and each geometric position of a given one of the indicia represents a point in a logarithmic calibration to the base 10, of the sine function from 0° to 90°. (As a practical matter, in calibrating the sine function logarithmically 0° cannot be reached, and in fact the lowest angular value which can be placed on the scale is 35 minutes. However, for the sake of ease of explanation this is not shown in the drawings.) The indicia shown on scale 37 of course card 32, i.e., the inner scale, commence at the VORTAC Distance window 42 and increase in value in the clockwise direction so as to correspond to the sine function of angular values of 90° or less. That is, in the example given in FIG. 8 since the illustrated course card 32 is for a course of 050° the calibration on the inner scale will commence with 050° and proceed through 90°. The indicia of the outer scale 36 also commence at the VORTAC Distance window 42 and decrease in value in the counter clockwise direction so as to correspond to the sine function for angular values of 90° through 180°. That is, the outer scale commences with the value of 230° (050 + 180) and decreases in the counter clockwise direction through 140°. In viewing the course card illustrated in FIG. 8 it is to be noted that as the sine function progresses through 180° there are two angles inscribed in any given position on the course card. This arises out of the fact that, from trigonometry, the sine function increases from 0 to 1 as the angle increases from 0° to 90°, and as the angle increases from 90° to 180°, the sine function decreases from 1 to 0. Therefore, there will in fact be two sets of numerals appearing at each geometric position on the course card. The numerals appearing on a course card each individually represent the sum of the angle so described at that point to the nearest full degree and the number of degrees for the course heading for that particular course card, as indicated by the example given hereinabove. There will, thus, be a different course card for each full degree of course heading, and there will, thus, be 360 course cards. The various numbers of scales 36 and 37 will appear in the two windows labeled VORTAC BEARING of the back plate in FIG. 2. When the card is rotated, the corresponding numbers of scale 30 on the back of the distance plate of FIG. 7 will also appear in the window labeled VORTAC DISTANCE as seen in FIG. 2.

The back plate 34 of FIG. 2 is mounted on the back portion of the center post adjacent to the course card of FIG. 8. The back plate and the course card are secured by locknut "F" but allowed to rotate freely on the center post. Tab "E" of FIG. 12 is a radial extension of the back plate of FIG. 2 which extends forward to the front level of the base plate. Lockscrew "D" of FIG. 12 is a simple threaded screw which when advanced through the threads of tab "E" engages the rims of the base plate and distance plate, thus securing all three plates. As shown in FIG. 12, the course card 32 is not engaged and remains free to rotate as desired. The third window of the back plate allows the numbers of the back of the distance plate to be visualized when the course card window labeled VORTAC DISTANCE is positioned beneath window 40 in tab "E."

FIG. 9 demonstrates the relative position of the various plates and course card in schematic expanded fashion. The center post assembly is shown in FIG. 10 with an oblique view while a cross sectional elevation of the center post is depicted in FIG. 11.

The basic principle of my computer is simple trigonometry expressed in logarithmic form, however, the arrangement of the scales and their numerical display are quite unique. When a given course line passes a fixed reference point, e.g. a VORTAC station, a line drawn from the fixed reference point to a position on the course line forms an acute angle. The sine of that acute angle, i.e., the angle of intercept, multiplied by the distance from that position on the course line to the fixed reference point equals a CONSTANT which is always equal to the product of the distance from from the fixed reference point to any position on that course line and the sine of the acute angle formed at that position.

FIG. 1 shows the assembled computer with the front plate up. As clear plastic tab "B" is rotated clockwise or counterclockwise, the three digit numbers of scale 16 on the course plate appear in the window labeled COURSE and extend through a range of three hundred and sixty degrees, Tab "C" of FIG. 1 rotates the azimuth plate clockwise or counterclockwise in such a fashion that the three digit numbers of scale 20 appear in the window labeled azimuth The radial numbers of scale 21 ranging from zero to ninety degrees along the margin of the azimuth plate as seen in FIG. 1 rotate with tab "C." As it can be seen for any given course line and any given azimuth from the fixed reference point to a position on the course line, the ACUTE ANGLE OF INTERCEPT will always be described by the radial number on scale 21 of the azimuth plate lying beneath the score on the clear plastic tab "B." Thus, the scale 21 represents the algebraic sum of the numbers indexed on scales 16 and 20.

The desired distance from the fixed reference point along the azimuth line to the course line is projected through the DISTANCE window of the base plate, as seen in FIG. 1, by rotating the distance plate clockwise or counterclockwise through its range of one nautical mile to one hundred nautical miles. The scale 28 as seen in FIG. 6 is calibrated in logarithmic proportions (base 10) so that the appropriate digits appear at 3.6° intervals. After the desired distance has been established in the DISTANCE window of the base plate as seen in FIG. 1, tab "E" on back plate 34 is rotated to the position opposite the ACUTE ANGLE OF INTERCEPT on scale 24 inscribed on the base plate as determined from tab "B." In FIG. 5, the sine function of the ninety degrees of an acute angle is calibrated in logarithmic proportions (base 10) counterclockwise on scale 24 along the margin of the base plate so that the appropriate readings will be separated by at least 3.6 degrees or its multiple. After the lockscrew "D" in FIG. 1 has been secured, the computer will be programmed with the CONSTANT that exists along that given course with respect to the fixed reference point since the logarithmic value of the distance from the fixed reference point to a given point on that course line has been added to the logarithmic value of the sine of that acute angle so formed. That is, by positioning tab E in the manner described hereinabove the back plate 34 will be caused to assume a rotational position corresponding to the sum of the logarithmic value of the distance from the fixed reference point to a given point on the course line of and the logarithmic value of the sine of the angle of intercept.

The course card of FIG. 8 is one of three hundred and sixty interchangeable course cards so arranged that their sequence differs by one degree respectively. The particular course card depicted in FIG. 8 is appropriate for a course of 050°. The calibration is clockwise expressing the sine function from zero to 180° in logarithmic proportions (base 10) at 3.6° intervals. The positions are so labeled that the bearing to or from the fixed reference point to any position on the given course line designated from the course card will actually represent the logarithmic value of the ACUTE ANGLE OF INTERCEPT. In FIG. 7 as previously noted, the back of the distance plate is calibrated similar to the front of the distance plate in FIG. 6 except the progression is clockwise. As seen in FIG. 2 the course card may be rotated in either direction exposing the various bearings in the VORTAC BEARING windows of the back plate. For each bearing, there is a distance seen in the VORTAC DISTANCE window of the course card. By subtracting the logarithmic value of the sine of the acute angle represented by the bearing displayed in the VORTAC BEARING window from the previously established CONSTANT, the remaining logarithmic value appears in the window of the course card labeled VORTAC DISTANCE which corresponds to the distance from the fixed reference point to that position on the given course line. The preferred embodiment of this invention described hereinabove is only exemplary of the principles of the invention, and it is contemplated that modifications to or changes in the preferred embodiment may be made within the scope of the invention as defined in by the appended claims.

In order to provide a clearer understanding of the result of the above described design of a course card in permitting one to reach the result described immediately above it should be noted that the bearing of an aircraft with respect to a fixed reference point will always be within 180°. That is, an aircraft approaches and passes the fixed reference point, the bearing to or from that reference point will change only by 180° at a maximum. Accordingly, the computer described herein each of the course cards are labeled in a manner such that the beginning numeral is the heading, i.e., the magnetic bearing of the desired course line, by which that particular course card is identified, and the numerals on that card, on the inner scale, increase from the desired heading through 90°. The numerals on the outer scale then commence with 90° and go through 180°. It can readily be seen that when the reference point is located to the right of the course line, all bearings for a given course line will be bearings from the aircraft to the reference point in question. should the fixed reference point be to the left of the course line, the bearings will be from that fixed reference point to the aircraft. The actual values for each degree of bearing to or from a fixed reference point appearing at each of the 100 positions on each given course card represent the logarithm to the base 10 of the sine of an angle corresponding to the bearing angle less the desired course heading. In accorance with trigonometric principles the sine function increases from 0 to 1 as the angle increases from 0° to 90°, and it decreases from 1 to 0 as the angle increases further from 90° to 180°. Therefore, each position of the course card represents two angles between 0° and 180° for each sine value.

I claim:

1. A navigational computer, comprising:

a central axis member, a plurality of concentrically arranged discs mounted on said central axis member for rotation, said discs having scale means arranged thereon in a relationship to facilitate the computation of bearing and distance from a given point on a predetermined course line to a predetermined reference point, first course scale means having angular values inscribed thereon in degrees, azimuth scale means having angular values inscribed thereon in degrees, angle of intercept scale means having angular values linearly inscribed thereon in degrees, first index means, said first course, azimuth and angle of intercept scae means being arranged on said discs relative one to the other and to said first index means so that values on said first course and azimuth scale means, indexed one with the other, will place a value, which is the algebraic sum of the indexed values on said first course and azimuth scale means on said angle of intercept scale means adjacent said first index means, first distance scale means having distance values inscribed thereon logarithmically, sine of the angle of intercept scale means having values inscribed thereon spaced in accordance with the logarithm to the base 10 of the sine function of a range of angular values with numerals occurring on the scale being of angular values, second index means, said first distance and sine of the angle of intercept scale means being arranged on separate ones of said discs relative to one another and to said second index means so that when values on said first distance and sine of the angle of intercept scale means are indexed one with the other, positioning said second index means adjacent the value on said sine of the angle of intercept scale means which equals said algebraic sum will cause said second index means to assume an angular position relative to the indexed values on said first distance and sine of the angle of intercept scales and corresponding to the product thereof, second course scale means having values inscribed linearly thereon in accordance with the logarithm of the sine function of a range of angular values in increments of a predetermined number of degrees commencing with a predetermined angular value, said second course scale means being labeled with numerals representing the degrees of said angular values, second distance scale means having distance values inscribed thereon logarithmically and with numerals occuring at intervals of said predetermined number of degrees, said second course and second distance scale being arranged on ones of said discs relative to one another and relative to said second index means such that indexing a selected angular value on said second course scale with said second index means will cause a predetermined portion of said second course scale to index a value on said second distance scale means corresponding to the distance value which when multiplied by the sine of said selected angular value equals the aforesaid product.

2. The navigation computer defined in claim 1 further comprising a plurality of discs, each of which contains a second course scale means, but on each of which the said second course scale means commences with a differing angular value, the one of said discs on said computer bearing said second course scale means being replaceable by any one of said plurality of discs bearing second course scale means.

3. The navigation computer defined in claim 1 further comprising locking means connected to second index means for locking the said discs bearing said first course, azimuth, angle of intercept, first distance and sine of the angle of intercept scales in position after said second index means has been placed adjacent one of the indexed values on said first distance and sine of the angle of intercept scales.

4. The navigation computer defined in claim 1 wherein said predetermined number of degrees equals 3.6°.

* * * * *